(12) United States Patent
Canino

(10) Patent No.: US 10,603,625 B1
(45) Date of Patent: Mar. 31, 2020

(54) CARBON CAPTURE SYSTEMS AND METHODS

(71) Applicant: Robert Canino, Sewell, NJ (US)

(72) Inventor: Robert Canino, Sewell, NJ (US)

(73) Assignee: Global C2 Cooling, Inc., Sewell, NJ (US)

( * ) Notice: Subject to any disclaimer, the term of this patent is extended or adjusted under 35 U.S.C. 154(b) by 0 days.

(21) Appl. No.: 16/594,308

(22) Filed: Oct. 7, 2019

(51) Int. Cl.
*B01D 53/14* (2006.01)
*B01D 53/04* (2006.01)
*B01D 53/62* (2006.01)

(52) U.S. Cl.
CPC ..... *B01D 53/1475* (2013.01); *B01D 53/0407* (2013.01); *B01D 53/62* (2013.01); *B01D 2257/504* (2013.01)

(58) Field of Classification Search
CPC ........................ B01D 53/1475; B01D 53/0407; B01D 53/62; B01D 2257/504
See application file for complete search history.

(56) References Cited

U.S. PATENT DOCUMENTS

| | | | |
|---|---|---|---|
| 8,157,892 B2 | 4/2012 | Udi | |
| 9,861,933 B2 | 1/2018 | Wright et al. | |
| 10,010,829 B2 | 7/2018 | Wright et al. | |
| 10,512,358 B1* | 12/2019 | Perrelli | B01F 15/00305 |
| 2002/0021006 A1* | 2/2002 | Mallis | F16L 15/004 |
| | | | 285/334 |
| 2007/0054023 A1* | 3/2007 | Bingley | A23L 2/52 |
| | | | 426/548 |

* cited by examiner

*Primary Examiner* — Cabrena Holecek
(74) *Attorney, Agent, or Firm* — Law Offices of Damon L. Boyd, PLLC

(57) ABSTRACT

Devices, systems and methods for capturing $CO_2$ in a form that can be stored, processed, and/or converted to usable products is desirable. Systems capture $CO_2$ using small scale, individual devices at a vast number of locations which, in the aggregate, are capable of significantly decreasing $CO_2$ concentrations in the atmosphere on a global scale. When such small devices are placed in areas already occupied with a structure, i.e., office buildings, apartments, homes, automobiles and the like, though the amount of $CO_2$ removal by each individual device may be relatively small, in the aggregate, significant amounts of $CO_2$ may be removed at a more macro or even global scale.

18 Claims, 5 Drawing Sheets

CARBON CAPTURE SYSTEMS AND METHODS

FIELD OF THE INVENTION

The invention relates to the field of small scale systems and methods for removing $CO_2$ from the atmosphere.

BACKGROUND

As the fear of global warming increases day by day and as documented by the world's scientific community, immediate action must be taken to reduce $CO_2$ concentrations in the atmosphere on a global scale. In this regard, $CO_2$ emissions come from a variety of sources on the planet and reducing this gas is paramount in slowing and stopping global warming.

A variety of existing systems have been developed to capture $CO_2$ at the source of $CO_2$ emissions, such as at the exhaust towers of electric power plants. For example, some systems include scrubbing gasses containing carbon dioxide with an aqueous solution of sodium hydroxide to react the carbon dioxide to form a first aqueous solution containing sodium carbonate, and then separating the anhydrous sodium carbonate from the first aqueous solution. Then, the anhydrous sodium carbonate is treated by causticization to generate carbon dioxide and sodium hydroxide. Other systems use a vacuum chamber for a direct air capture by enclosing an interior space with a housing that has an absorber therein. Gas can be circulated through a vacuum chamber and past the absorber structure to absorb $CO_2$.

However, these devices focus on large scale industrial applications, are expensive and may have their own respective adverse environmental impacts. They are not suitable to low air volume and low flows that capture carbon in the home or smaller scale settings.

Thus, systems and methods that capture $CO_2$ in a form that can be stored, processed, and/or converted to usable products is desirable. In particular, desirable systems capture $CO_2$ using small scale, individual devices at a vast number of locations which, in the aggregate, are capable of significantly decreasing $CO_2$ concentrations in the atmosphere on a global scale.

SUMMARY OF THE INVENTION

The present disclosure comprises devices, systems and methods for capturing $CO_2$ in a form that can be stored, processed, and/or converted to usable products is desirable. The present disclosure contemplates systems that capture $CO_2$ using small scale, individual devices at a vast number of locations which, in the aggregate, are capable of significantly decreasing $CO_2$ concentrations in the atmosphere on a global scale. For example, in contrast to attempting to remove larger quantities of $CO_2$ in smaller areas which could have their own corresponding negative environmental impacts, when small devices are placed in areas already occupied with a structure, i.e., office buildings, apartments, homes, automobiles and the like, though the amount of $CO_2$ removal by each individual device may be relatively small, in the aggregate, significant amounts of $CO_2$ may be removed at a more macro or even global scale.

BRIEF DESCRIPTION OF THE DRAWINGS

The accompanying drawings provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
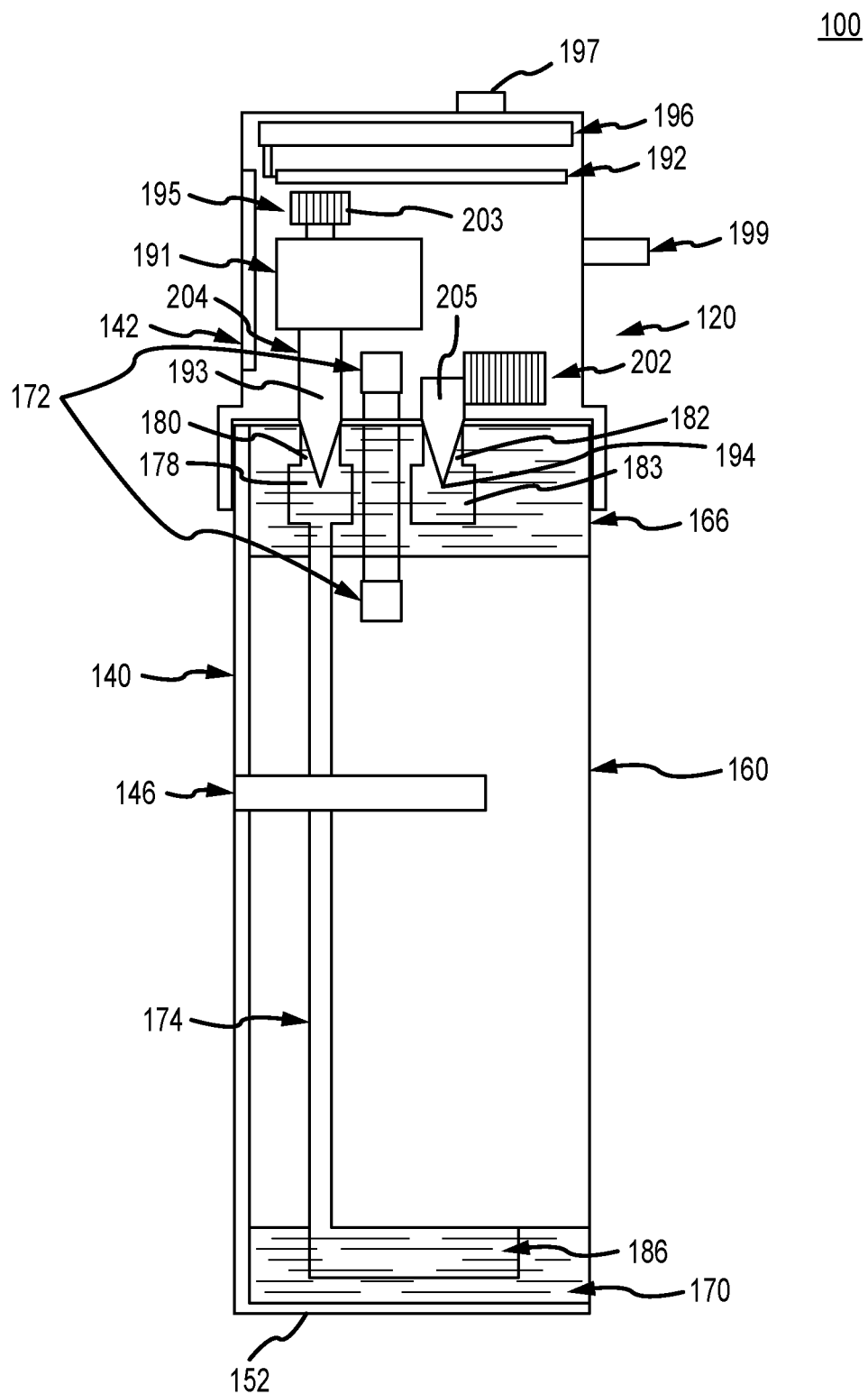
FIG. 1 is a cross-sectional front view of an embodiment of a $CO_2$ removal device having a housing, a carriage and a cartridge in accordance with the present disclosure.

Persons skilled in the art will readily appreciate that various aspects of the present invention may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale but may be exaggerated to illustrate various aspects of the present invention, and in that regard, the drawing figures should not be construed as limiting. Finally, although the present invention may be described in connection with various principles and beliefs, the present invention should not be bound by theory.

The above being noted, the present disclosure contemplates systems and methods that capture $CO_2$ in a form that can be either stored, processed, and/or converted to usable products. In particular, systems developed to capture $CO_2$ using small scale, individual devices to capture $CO_2$ in a vast number of locations in the aggregate are capable of significantly decreasing $CO_2$ concentrations in the atmosphere on a global scale.

For example, in contrast to attempting to remove larger quantities of $CO_2$ in smaller areas which could have their own corresponding negative environmental impacts, by removing smaller quantities of $CO_2$ from the ambient air utilizing smaller scale devices may be desirable and less impactful on the environment. For example, by placing such devices in a very large number of locations, the aggregate of the smaller quantities of $CO_2$ removed become significant— millions of households and automobiles removing just a few pounds of $CO_2$ each can remove many millions of pounds of $CO_2$ from the atmosphere each year.

In accordance with an embodiment of the present disclosure and with reference to FIG. 1, a $CO_2$ removal device 100 comprises a housing 120, a carriage 140, and a cartridge 160. The housing 120, carriage 140 and cartridge 160 may each be made of any suitable material now known or as yet unknown in the art, including polymers, metals, ceramics and other materials.

In accordance with various aspects of the present disclosure, the carriage 140 functions to support the cartridge 160 and/or the housing 120. In general, the carriage 140 is configured for simple and optionally, removable, attachment to office buildings, homes, apartments, automobiles and the like, and in some embodiments, those structures' air handling and treatment systems. In alternative embodiments, the carriage 140 may be a free standing unit, unattached to any other structure (other than the other components of the $CO_2$ removal device 100).

The carriage 140 can secure a removable cartridge 160 by mechanical engagement between the two components. For example, with reference to FIG. 2, the carriage 140 may have a bottom support ledge 152 for supporting the cartridge 160. In various embodiments, the bottom support ledge 152 may have a substantially similar profile to a bottom cap 170 and may have a ledge guide 144 for engaging and aligning the cartridge 160 (as described below).

The carriage 140 may further comprise one or more alignment guides 146 to ensure the cartridge 160 is aligned so a male air inlet pin 193 and a male air exit pin 194 properly pierce a sealing film on the cartridge 160. Rubber gaskets for hermetically sealing the housing 120 and cartridge 160 may be provided as well.

Figure 2:
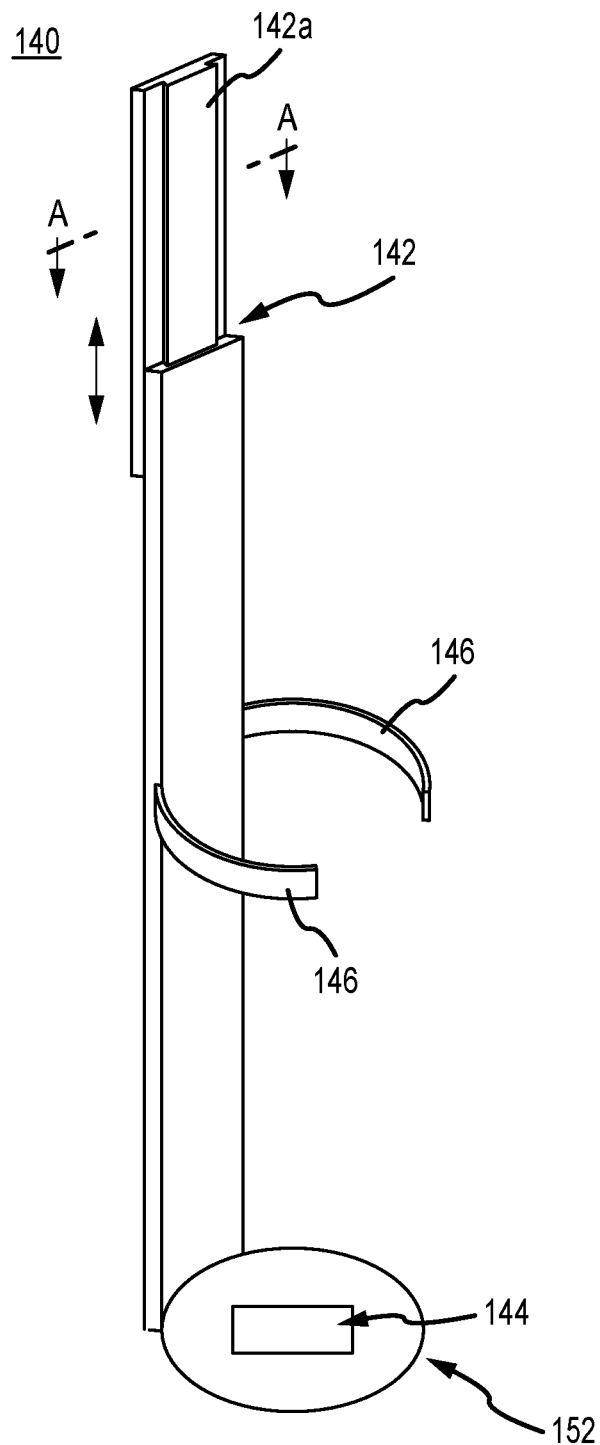
FIG. 2 is a perspective view of an embodiment of a carriage of a $CO_2$ removal device in accordance with the present disclosure.

Additionally, for example, with continued reference to FIG. 2, alignment guides 146 are illustrated as "arms" which may also grip the cartridge 160 and secure it in place. The alignment guides 146 may be suitable flexible and oriented slightly smaller than a width or diameter of the cartridge 160 such that the cartridge 160 and alignment guides 146 engage in a "snap fit" manner. Additionally, the cartridge 160 may also have a guiding mechanism 188 (see FIG. 3) corresponding to the one or more alignment guides 146 of the carriage 140, such as an indentation or other configuration that assists with the engagement and proper placement of the cartridge 160 on or in the carriage 140. In various embodiments and as illustrated in FIGS. 2 and 3, the alignment guides 146 and/or guiding mechanism 188 are located approximately halfway up the carriage 140, though the location of the alignment guides 146 and guiding mechanism 188 may vary depending on the application.

In accordance with the present disclosure, the cartridge 160 is configured as a vessel with an internal volume capable of containing a liquid such as a $CO_2$ absorbing solution (as described in more detail below). The cartridge 160 is typically cylindrical, though other shapes and configurations may be desirable and are within the scope of the present disclosure. Depending on the particular application and design considerations, the size of the cartridge 160 may vary based on considerations such as the desired amount and speed of carbon absorption of the $CO_2$ absorbing solution, the amount of $CO_2$ present in the environment, and other factors.

In accordance with various aspects of the present disclosure, the $CO_2$ absorbing solution is a solution of sodium carbonate or other commercially available $CO_2$ absorbing solution exhibiting phase change to a sodium bicarbonate precipitate. For example, potassium carbonate or other amines may be used and fall within the scope of the present disclosure. The volume of $CO_2$ absorbing solution is determined by the requirements of the specific size reaction chamber.

Figure 3:
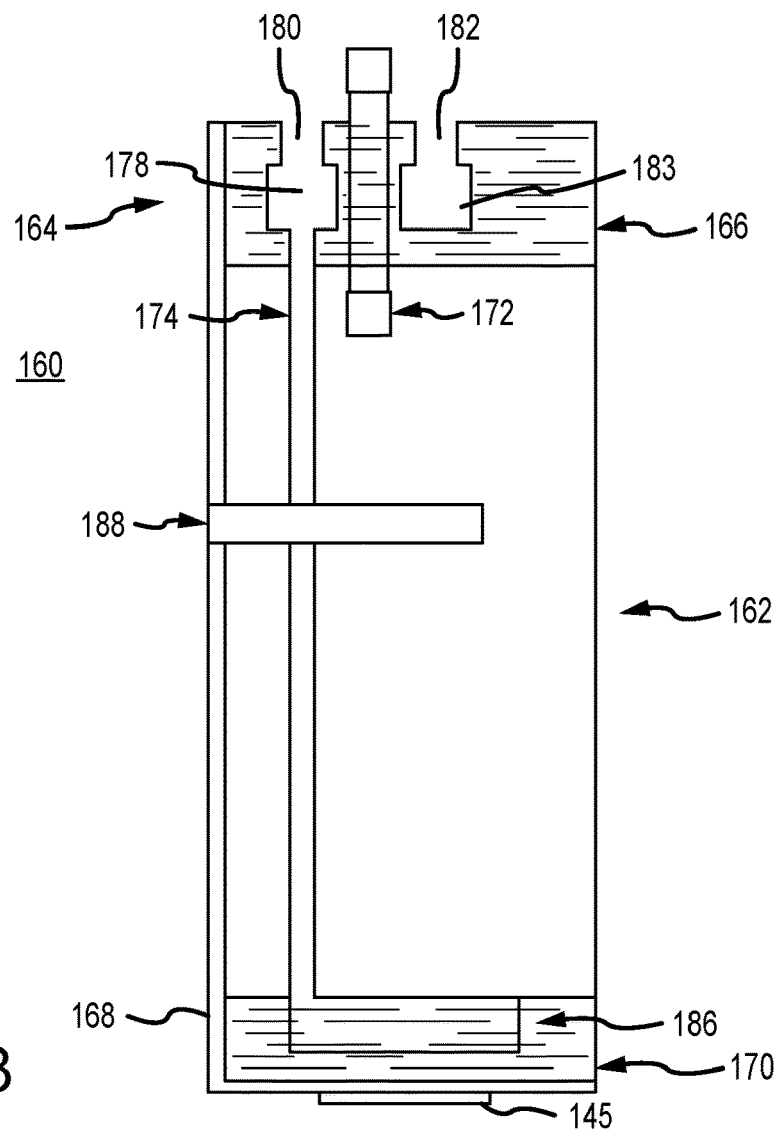
FIG. 3 is a cross-sectional front view of an embodiment of a cartridge of a $CO_2$ removal device in accordance with the present disclosure.
Figure 5:
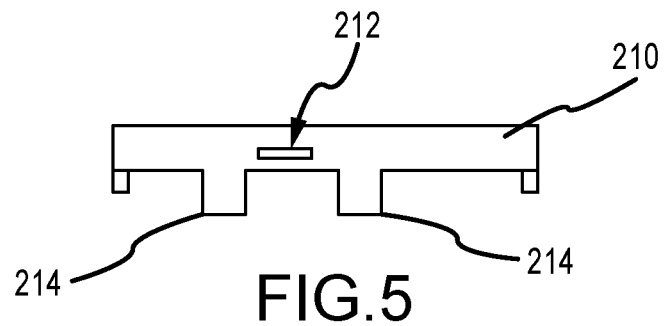
FIG. 5 is a cross-sectional view of an embodiment of a sealing plate in accordance with the present disclosure.

With reference to FIG. 3, the cartridge 160 may comprise a cartridge body 162 having a cartridge top portion 164 that connects with a removable top cap 166. The cartridge top portion 164 and top cap 166 may be threaded so that they may screw together via their respective threads. Similarly, the cartridge 160 may also comprise a cartridge bottom 168 that connects with a removable bottom cap 170. The bottom cap 170 may have a ledge guide engagement mechanism 145 for example, in the form of an indentation that engages the ledge guide 144.

The cartridge bottom 168 and bottom cap 170 may be threaded so that they may screw together via their respective threads. The top cap 166 and bottom cap 170 may be comprised of the same material as the cartridge body 162 or either or both may be comprised of material different than the cartridge body 162. Additionally, rather than via a threaded connection, the top cap 166 and bottom cap 170 may connect via an alternative mechanism such as via a "snap-fit" or other hermetically sealable locking mechanism.

With continued reference to FIG. 3 and in accordance with various embodiments of the present disclosure, the top cap 166 is provided having an air inlet female pin receptacle 180 and an air exit female pin receptacle 182. The air inlet female pin receptacle 180 allows air to enter the cartridge 160 and the air exit female pin receptacle 182 allows air to exit the cartridge 160 after passing through the $CO_2$ absorbing solution. A primary purpose of the top cap 166 is to allow the filling and then closing of the cartridge 160 and to provide the structure for creating a sealed interface between the cartridge 160 and the housing 120 (as described herein). The size of the top cap 166 is determined by the size of the cartridge 160. Once filled and sealed, the cartridge 160 can be transported to a designated location. In accordance with various aspects of the present disclosure, the air inlet female pin receptacle 180 and the air exit female pin receptacle 182 may be connected to a check valves 178, 183 to prevent the $CO_2$ absorbing solution from leaking from the cartridge 160.

The top cap 166 may comprise a flexible tube 174 connected to the first check valve 178 at the top of the top cap 166 and connected to an aerator 186 (as described below) located towards the bottom 168 of the cartridge 160. The flexible tube 174 is made from any suitable tubing able to withstand the $CO_2$ absorbing solution (e.g., PVC, rubber, metal, etc.), with a diameter based on the internal volume of the cartridge 160 and the volume of air required for the $CO_2$ absorbing solution to absorb $CO_2$ over a certain unit of time.

With continued reference to FIG. 3, the cartridge 160 may comprise a latching mechanism 172 to help connect the cartridge 160 and the housing 120. For example, in accordance with the present disclosure, the cartridge 160 can be held in place with a latching mechanism 172 comprised of a clip that follows the circumference of cartridge 160 reaching the other end of the alignment guide 146. The clip can connect to the other side and snap into place, putting the pressure against the circumference of the cartridge 160 and thus holding it in place.

In accordance with the present disclosure, the housing 120 is configured to engage the cartridge 160 in a hermetically sealed manner and in accordance with various aspects, the housing 120 engages, for example, the cartridge 160 from above.

Figure 4:
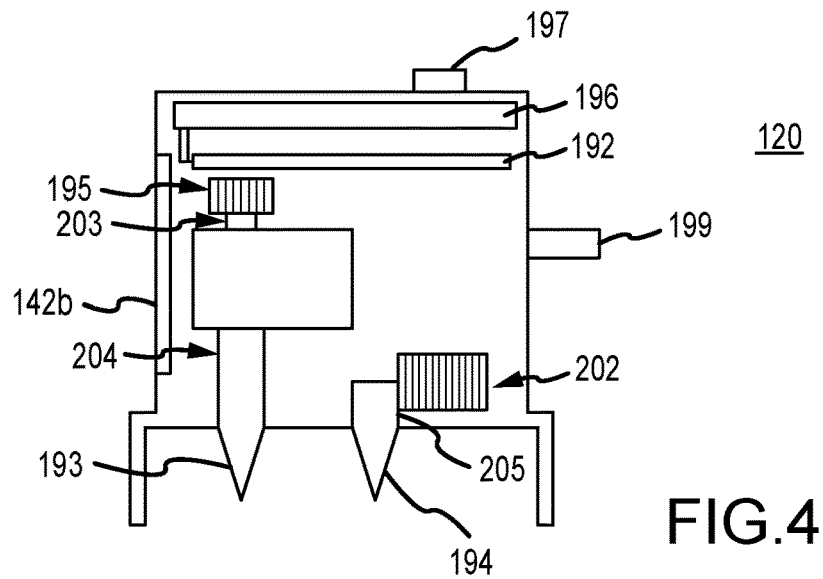
FIG. 4 is a cross-sectional front view of an embodiment of a housing of a $CO_2$ removal device in accordance with the present disclosure.

In accordance with the present disclosure and with reference to FIGS. 1, 2 and 4, the housing 120 may contain a handle 199, an air pump 191, a computer circuit board 192, the male air inlet pin 193, and the male air exit pin 194. In accordance with various aspects of the present disclosure, an on/off switch 197 for powering the air pump 191 may be provided, for example, on the housing 120. Various handles may alternatively be located on the carriage 140 and/or cartridge 160 as well. The housing 120 may have an air inlet vent 195 for air to enter the $CO_2$ removal device 100 and an exterior vent 202 for air to exit the $CO_2$ removal device 100.

The male air inlet pin 193 and the male air exit pin 194 are both generally located on the bottom portion of the housing 120.

In some embodiments, the exterior vent 202 may have a flexible tube 205 connected to the male air exit pin 194 on located the bottom of the housing 120. A primary purpose of the connection between the exterior vent 202 and the male air exit pin 194 is to vent air in the $CO_2$ removal device 100 and to prevent pressure build-up. Unreacted air is thus removed from the $CO_2$ removal device 100. The diameter of the male air exit pin 194, tube 205 and exterior vent 202 may be determined by the volume of air required based on the composition of the air, volume of air desired and similar factors.

Additionally, in accordance with various aspects of the present disclosure, the housing 120 may have a pin type electrical connection to power the air pump and other electronics and may have a light (e.g., an LED) indicating proper operation of the $CO_2$ removal device 100.

In accordance with various aspects of the present disclosure and with reference to FIG. 4 and back to FIG. 2, the carriage 140 may incorporate a sliding mechanism such as a "dovetail" design to engage the housing 120. The sliding mechanism allows connection and easy movement of the housing 120 in a vertical direction (as described below). For example, the sliding mechanism 142a on the carriage 140 is the "female" side of the dovetail and, as described below, engages a "male" side of the dovetail 142b to facilitate connection between the carriage 140 and the cartridge 160 (though these orientations may be reversed). The sliding mechanism 142 may be made of the same material as the carriage 140 and/or housing 120 or any alternatively suitable material, depending on the particular application.

In operation, the housing 120 connects to the carriage 140 using the sliding mechanism 142a,b on the side of the carriage 140 by sliding in a vertical motion until the housing 120 engages the cartridge 160. As the housing 120 engages the cartridge 160, the mail air inlet pin 193 and the male air exit pin 194 pierce the sealing film on the cartridge 160 so that ambient air can enter and leave the internal volume of the cartridge 160. In accordance with various embodiments, the housing 120 may be engaged with the cartridge 160 either before or after the cartridge 160 is attached to the carriage 140.

Figure 6:
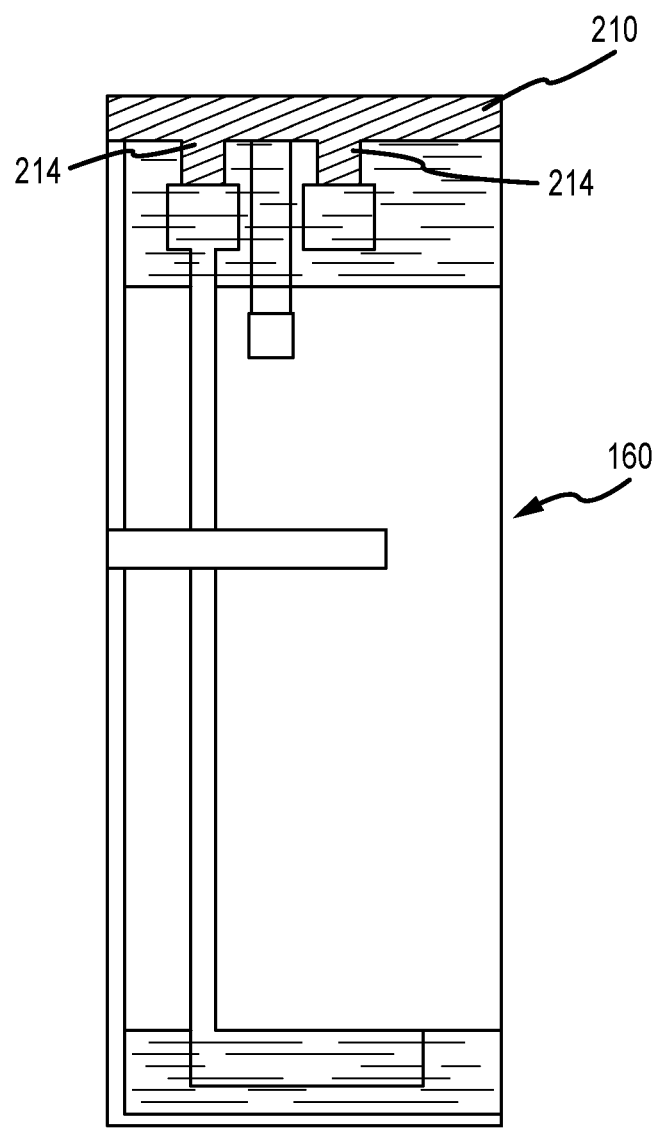
FIG. 6 is a cross-sectional view of an embodiment of a sealing plate attached to a cartridge in accordance with the present disclosure.
Figure 7:
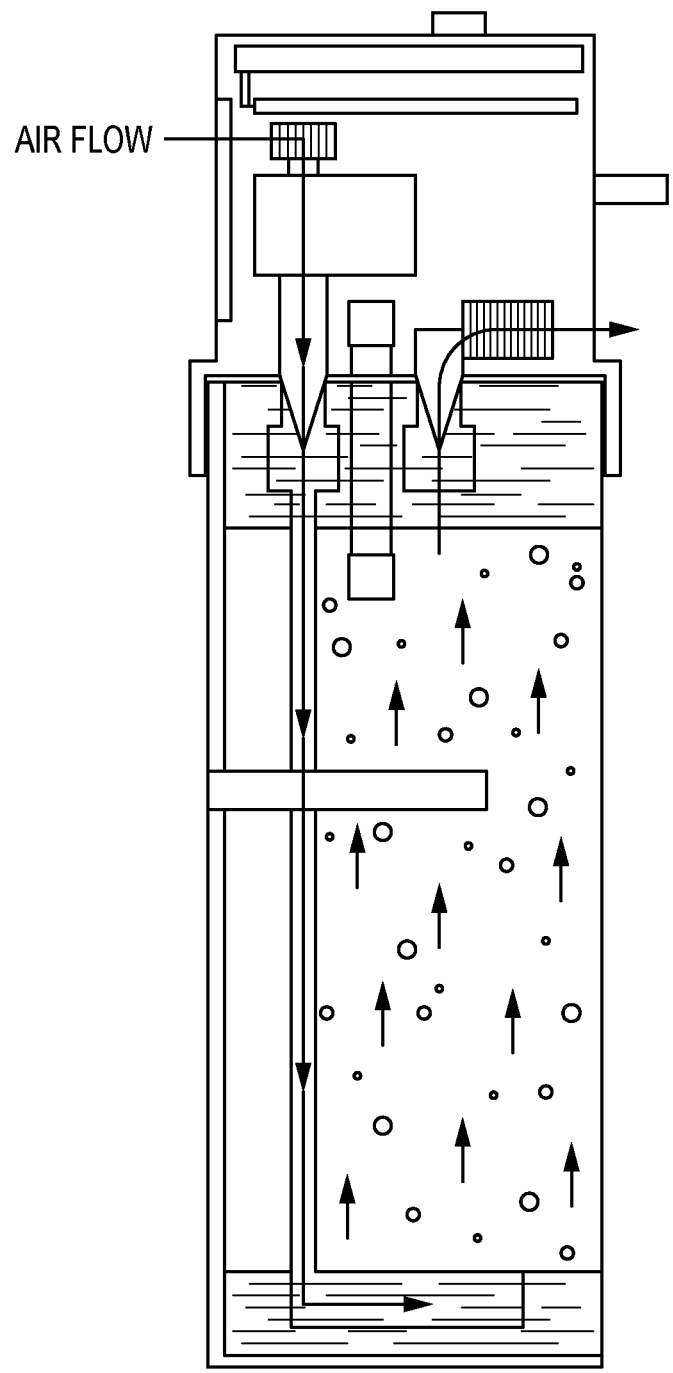
FIG. 7 shows the flow of air through an embodiment of a $CO_2$ removal device in accordance with the present disclosure.

In accordance with various aspects of the present disclosure, FIGS. 6 and 7 illustrate an exemplary sealing plate 210 for sealing the carbon absorbing solution for safe shipping of the cartridge 160, either or both prior to use of the cartridge 160 and after use of the cartridge 160. The sealing plate 210 is generally configured to match the size of the top cap 166. The sealing plate 210 may have a latching mechanism 212 configured to lock the sealing cap in place on the cartridge 160 and/or sealing pins 214 which engage the air inlet female pin receptacle 180 and the air exit female pin receptacle 182 during transport and the like (see FIG. 7).

As noted above, in accordance with various aspects of the present disclosure, the cartridge 160 comprises an internal volume (or reaction chamber) containing the $CO_2$ absorbing solution and the aeration system. The aeration system may comprise a conventional air pump 191 powered by any conventional means, including battery (DC, which may also be rechargeable), a solar panel 196, or wired power (e.g., AC). The air pump 191 supplies the ambient air to the $CO_2$ removal device 100. The power requirements and size of the air pump 191 may be determined by the volume of air required based on the composition of the air, volume of air desired and similar factors.

In accordance with various embodiments of the present disclosure, the housing 120 may have an air inlet vent 195 connecting an exterior air inlet tube 203 to the air pump 191. A second tube 204 connects the air pump 191 to the top of a male air inlet pin 193. When the housing 120 is lowered into place, the male air inlet pin 193 engages the air inlet female pin receptacle 180 located on the cartridge 160.

In accordance with various aspects of the present invention, the aeration system further comprises an aerator 186. The aerator 186 is any device capable of creating nano sized bubbles, for example, in the range of about 1 mm to about 50 mm, though the size of the bubbles may vary outside this range depending on the application. The nano sized bubbles provided by the air pump 191 increase the surface area of the air bubbles and maximize contact between the air and $CO_2$ absorbing solution. For example, in some embodiments, the aerator 186 is commercially available air stone made of a material sufficient to withstand being dissolved by the $CO_2$ absorbing solution. The aeration device is as determine by the requirements of the specific size reaction chamber.

FIG. 7 shows the flow of air through the $CO_2$ removal device 100 in accordance with the present disclosure. More specifically, air is drawn through the inlet vent 195 into the tube 203 by the air pump 191. The air is then pushed into the second tube 204 connecting the air pump 191 and the male air inlet pin 193. Air then travels through the flexible tube 174 to the aerator 186 and distributed as nano bubbles traveling vertically to the top through the $CO_2$ absorbing solution. The air then exits the $CO_2$ absorbing solution and enters the male air exit pin 194, through a tube 205, and exits through the exterior vent 202.

In accordance with various aspects of the present disclosure, a computer system may log atmospheric conditions and operating parameters of the $CO_2$ removal device 100. For example, in some embodiments, a computer circuit board 192 may be incorporated into the housing 120 to track various atmospheric conditions, air pump 191 operation, temperature, humidity, time, date, location, power produced, power used, air flow, and a unit ID of the $CO_2$ removal device 100 or the like. Data from the computer system may be transmitted to a central monitoring system or other point (cell phone, remote computer, etc.) via any now known or as yet unknown communication system such as ethernet, Wi-Fi, Bluetooth wireless or the like.

After designated period of time based upon the size of the $CO_2$ removal device 100, the cartridge 160 can be removed and sent to a facility, manufacturer or the like that will provide a replacement cartridge 160 to repeat the process. The cartridge 160 may be packaged and sent to an organization able to process the cartridge and extract the reacted carbon and recalibrate the cartridge for reuse.

It will be apparent to those skilled in the art that various modifications and variations can be made in the present invention without departing from the spirit or scope of the invention. For example, numerous materials, shapes, sizes and configurations can be substituted in place of those described herein. Thus, the present invention covers the modifications and variations of this invention provided they come within the scope of the appended claims and their equivalents.

I claim:
1. A $CO_2$ removal device, comprising:
    a housing, a carriage and a removable cartridge;
    wherein the removable cartridge comprises a top cap, a reaction chamber containing a $CO_2$ absorbing solution, and an aerator; and wherein the top cap further comprises an air inlet female pin and an air exit female pin, wherein the air inlet female pin is connected to a first check valve and the air exit female pin is connected to a second check valve; and a first flexible tube to connect the first check valve to the aerator.

2. The $CO_2$ removal device of claim 1, wherein the carriage comprises a bottom support ledge that supports the removable cartridge and the bottom support ledge having a ledge guide.

3. The $CO_2$ removal device of claim 2, wherein the removable cartridge further comprises a bottom cap, the bottom cap having a ledge guide engagement mechanism that engages the ledge guide.

4. The $CO_2$ removal device of claim 1, wherein the carriage comprises at least one alignment guide that engages the removable cartridge to at least one of align the removable cartridge on the carriage and secure the removable cartridge to the carriage.

5. The $CO_2$ removal device of claim 4, wherein the removable cartridge further comprises a guiding mechanism that engages the at least one alignment guide.

6. The $CO_2$ removal device of claim 1, wherein the carriage and the housing comprise a sliding mechanism that connects the carriage and the housing.

7. The $CO_2$ removal device of claim 6, wherein the sliding mechanism is a dovetail.

8. The $CO_2$ removal device of claim 1, wherein the housing comprises a male air inlet pin and a male air exit pin.

9. The $CO_2$ removal device of claim 8, wherein the housing further comprises an air inlet vent connecting an exterior air inlet tube to an air pump and a second tube connecting the air pump to the male air inlet pin.

10. The $CO_2$ removal device of claim 8, wherein the housing and cartridge are configured such that when the housing engages the removable cartridge, the male air inlet pin engages the air inlet female pin and the male air exit pin engages the air exit female pin.

11. The $CO_2$ removal device of claim 10, wherein the housing comprises an exterior vent.

12. The $CO_2$ removal device of claim 1, wherein the housing further comprises an air pump.

13. The $CO_2$ removal device of claim 12, wherein the air pump is powered by at least one of a battery, a solar panel, or wired power.

14. The $CO_2$ removal device of claim 1, wherein the $CO_2$ absorbing solution is a solution of sodium carbonate.

15. The $CO_2$ removal device of claim 1, further comprising a sealing plate.

16. The $CO_2$ removal device of claim 1, wherein the housing comprises a computer circuit board.

17. A $CO_2$ removal device, comprising:
a housing, wherein the housing further comprises:
an air pump;
a male air inlet pin and a male air exit pin;
an air inlet vent connecting an exterior air inlet tube to the air pump and a second tube connecting the air pump to the male air inlet pin; and
an exterior vent;
a removable cartridge, the removable cartridge further comprising:
a reaction chamber containing a sodium carbonate solution and an aerator;
a bottom cap, the bottom cap having a ledge guide engagement mechanism;
a guiding mechanism; and
a top cap, the top cap further comprising an air inlet female pin and an air exit female pin, wherein the air inlet female pin is connected to a first check valve and the air exit female pin is connected to a second check valve, and a first flexible tube to connect the first check valve to the aerator; and
a carriage, the carriage further comprising:
a bottom support ledge that supports the removable cartridge and the bottom support ledge having a ledge guide that engages the ledge guide engagement mechanism; and
an alignment guide that engages the guiding mechanism.

18. The $CO_2$ removal device of claim 17, wherein the housing further comprises a computer circuit board.

* * * * *